United States Patent [19]
Osborn et al.

[11] Patent Number: 5,465,818
[45] Date of Patent: Nov. 14, 1995

[54] PARK LOCK MECHANISM WITH MEANS TO PREVENT LOCKOUT MEMBER FROM ACCIDENTALLY BECOMING INOPERATIVE

[75] Inventors: Charles Osborn, Spring Lake; Robert M. Medema, Muskegon, both of Mich.

[73] Assignee: Grand Haven Stamped Products Div of JSJ Corporation, Grand Haven, Mich.

[21] Appl. No.: 178,876

[22] Filed: Jan. 7, 1994

[51] Int. Cl.$^6$ ..................................................... B60K 41/26
[52] U.S. Cl. ........................... 192/4 A; 192/4 R; 74/475; 74/483 R
[58] Field of Search ..................... 192/4 R, 4 A, 192/9; 74/475, 483 R, 483 K

[56] References Cited

U.S. PATENT DOCUMENTS

| | | |
|---|---|---|
| 4,880,092 | 11/1989 | Kito et al. . |
| 4,905,802 | 3/1990 | Gotoh . |
| 4,919,242 | 4/1990 | Muramatsu et al. . |
| 4,926,688 | 5/1990 | Murasaki . |
| 5,015,807 | 5/1991 | Ishizuki et al. . |
| 5,018,610 | 5/1991 | Rolinski et al. . |
| 5,062,509 | 11/1991 | Carpenter et al. . |
| 5,096,033 | 3/1992 | Osborn . |
| 5,129,494 | 7/1992 | Rolinski et al. . |
| 5,133,222 | 7/1992 | Hansson ............................ 192/4 A X |
| 5,211,271 | 5/1993 | Osborn et al. . |

FOREIGN PATENT DOCUMENTS

| | | |
|---|---|---|
| 0315173 | 5/1989 | European Pat. Off. . |
| WO9009904 | 9/1990 | WIPO . |

*Primary Examiner*—Andrea L. Pitts
*Attorney, Agent, or Firm*—Price, Heneveld, Cooper, DeWitt & Litton

[57] ABSTRACT

A park lock mechanism having a lockout arm which, if it is accidentally moved to a lock position while the pawl of the shifting lever is in another gear position, is movable by the pawl from such lock position to a third position permitting entry of the pawl into the park position and the lockout arm is then returned to its original lock position.

19 Claims, 4 Drawing Sheets

PARK LOCK MECHANISM WITH MEANS TO PREVENT LOCKOUT MEMBER FROM ACCIDENTIALLY BECOMING INOPERATIVE

This invention relates to a brake/park lockout mechanism and particularly, to a means for preventing the lockout member from accidentally becoming inoperative.

BACKGROUND OF THE INVENTION

Lockout mechanism systems for vehicle shifters wherein the brakes of the vehicle have to be applied before the shifter can be shifted from out of park to drive positions are common. Many different mechanisms have been devised for such purpose. One such mechanism is illustrated in FIG. 9 wherein a detent plate 100 is provided with a plurality of notches for positioning the shifting lever and releasably holding it in various positions. This is conventionally accomplished by providing the lever with a pawl 101 movable into any one of the numerous notches such as the notch "P" for the park position, the notch "R" for the reverse position, "N" for the neutral position, and "D," "$D_2$," "$D_1$" for various drive positions. In order to lock the pawl 101 in the notch "P" (the park position), a lockout arm 103 is provided. The lockout arm is pivotally mounted on the pin 104 at one end and at the other end a notch 105 is provided to capture the pawl 101. A spring 106 is attached to the base 107 at one of its ends and at the other of its ends is attached to a flange 108 extending from the lockout arm 103. A locking member or pin 109 is provided to lock the lockout arm 103 in lock position as disclosed by solid lines in FIG. 9. The pin 109 is forced in a direction orthogonal to the lockout arm 103 and when in the position as disclosed in FIG. 9, engages the edge 110 to hold pin 101 in the "P" notch, that is in the Park position. The pin 109 is withdrawn to a distended position when the brake of the vehicle is applied. As a result, the pawl 101 actuated at the top end of the shift lever (not shown in FIG. 9) can push the lockout arm 103 downwardly to permit the escape of pawl 101 from the "P" notch and be shifted to one of the other gear positions all of which will be explained in greater detail hereinafter.

The problem with this mechanism is that when the lockout arm 103 is pivoted downwardly to release the pawl 101, the pin 109 has a constant force exerted on it forcing it against the back face of the lockout arm 103. So long as it is in that position as disclosed by the dotted lines, the pawl 101 can enter the notch 105 after which it can move into the notch "P." However, although the spring 106 will tend to hold the lockout arm 103 in the dotted position wherein the pawl can reenter into the "P" notch, a sudden jolt caused by a bump in a road or other disturbances may cause the lockout arm 103 to jump upwardly into the position as disclosed in solid lines, in which position the force on the pin 109 forces it to extended position which locks the lockout arm in lock position. In this position, the pawl 101 located in any one of the other notches is blocked from reentering the park "P" position as illustrated by the pawl 101 shown in dotted lines.

SUMMARY OF THE INVENTION

The above problem of the lockout arm jumping into locking position and being held in that position by the locking pin is solved by this invention by providing a mechanism whereby the pawl can move the locking member out of the position as disclosed in solid lines in FIG. 9 so that the pawl can enter into the park "P" notch.

This mechanism comprises providing a slot in the pivotable end of the locking arm and providing a biasing member that pivotally biases the lockout arm to an unlock position and linearly biases the lockout arm to a locked position. With this mechanism, the lockout arm is held in locked position when the locking pin is extended. However, this locking position can be overridden by the pawl forcing the locking arm out of position until the pawl enters into the park "P" notch. Having briefly described the essential features of my invention, the following drawings together with the more detailed description will serve to explain the concepts and principles of the invention.

BRIEF DESCRIPTION OF THE DRAWINGS

Referring to FIGS. 1, 2, and 3 of the drawings, reference numeral 1 designates the shifter assembly which includes the base 2 on which is mounted the upright detent plate 3. Extending downwardly from the base 3 is a well 4 on which the shift lever 5 is pivotally mounted about the axis "X." The shift lever 5 includes a tubular handle 6 having an elongated element 7 frequently referred to as a "straw" extending through its bore. Mounted below the straw 7 and attached thereto is the pawl 8 which is biased upwardly by a spring 9. The straw 7 can be actuated downwardly by depressing on the button 10 so as to force the pawl 8 downwardly to permit the handle 6 to be shifted from one gear position to another, such gear positions being designated as "P" for park, "R" for reverse, "N" for neutral, and "D," "$D_2$," and "$D_1$" for the different drive positions. Each of these drive positions are established by the notches designated by the same letters.

Figure 1:
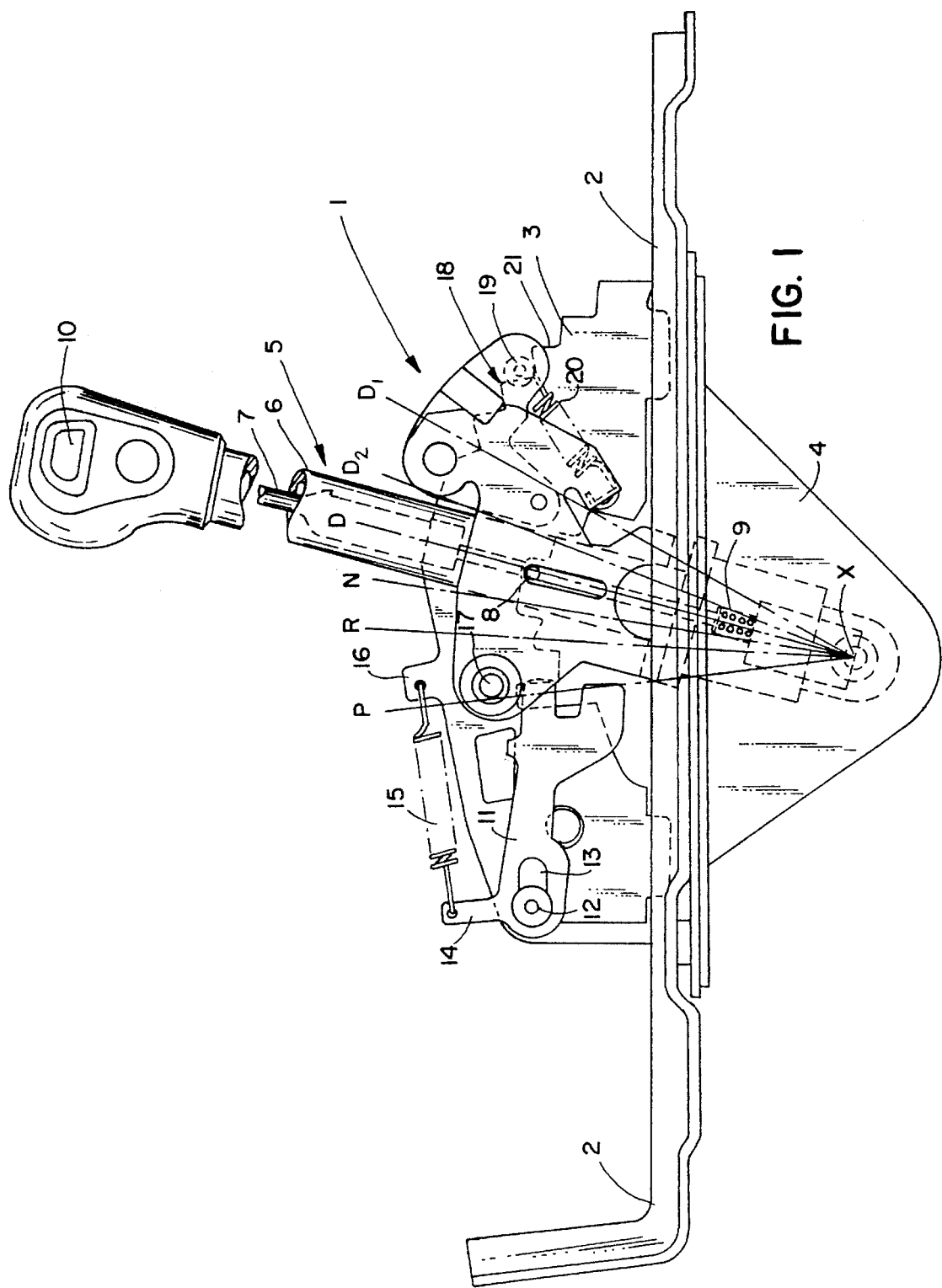
FIG. 1 is a side-elevational view of the shifter of this invention disclosing the lockout arm in unlocked position.
Figure 4:
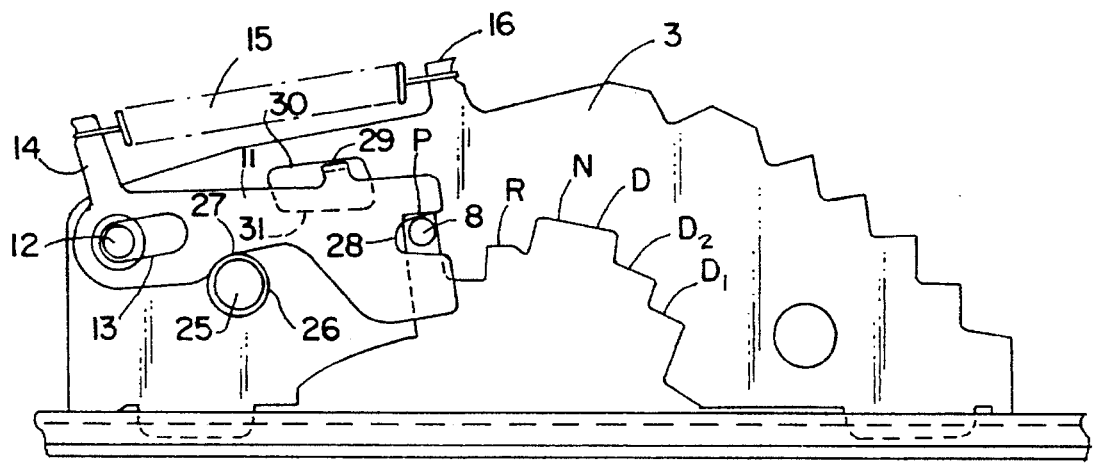
FIG. 4 a side-elevational view of the principal parts of this invention disclosing the pawl in park locked position.
Figure 6:
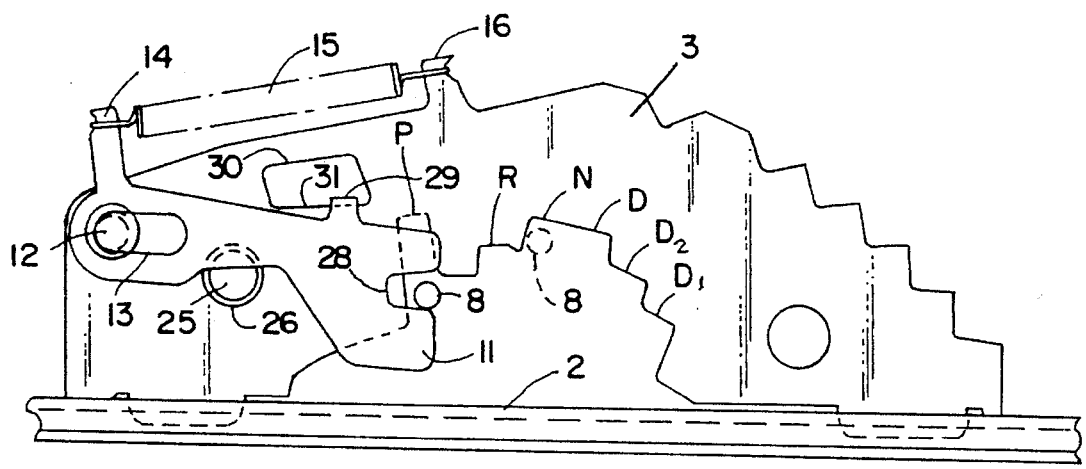
FIG. 6 is another side-elevational view like that of FIGS. 4 and 5 showing the pawl having forced the lockout arm downwardly into unlocked position thereby permitting the movement of the pawl into one of the other gear positions.

Lockout arm 11 is pivotally mounted on the upright detent plate 3 for movement into a lock position as disclosed in FIG. 4 or unlocked position as disclosed in FIGS. 1 and 6. Lockout arm 11 is pivotally mounted on the pin 12 which extends through a slot 13 in one end of the lockout arm thus permitting the lockout arm 11 to not only pivot, but to slide linearly as will be explained hereinafter. A lever arm 14 extends upwardly from the end of the lockout arm. A spring 15 is secured to the lever arm 14 and to a flange 16 extending upwardly from the detent plate 3. Spring 15 serves the dual function of pivoting the lockout arm 11 in a clockwise direction toward the unlocked position and to bias lockout arm 11 linearly toward the lock position as the slot 13 slides over the pin 12. A cable connector 17 is secured to the handle 6 so that shifting of handle 6 can be transmitted to a cable (not shown) secured to the cable connector 17.

The other end of the lockout arm 11 includes a notch 28 for receiving the pawl 8 previous to it entering into the park "P" notch.

Figure 2:
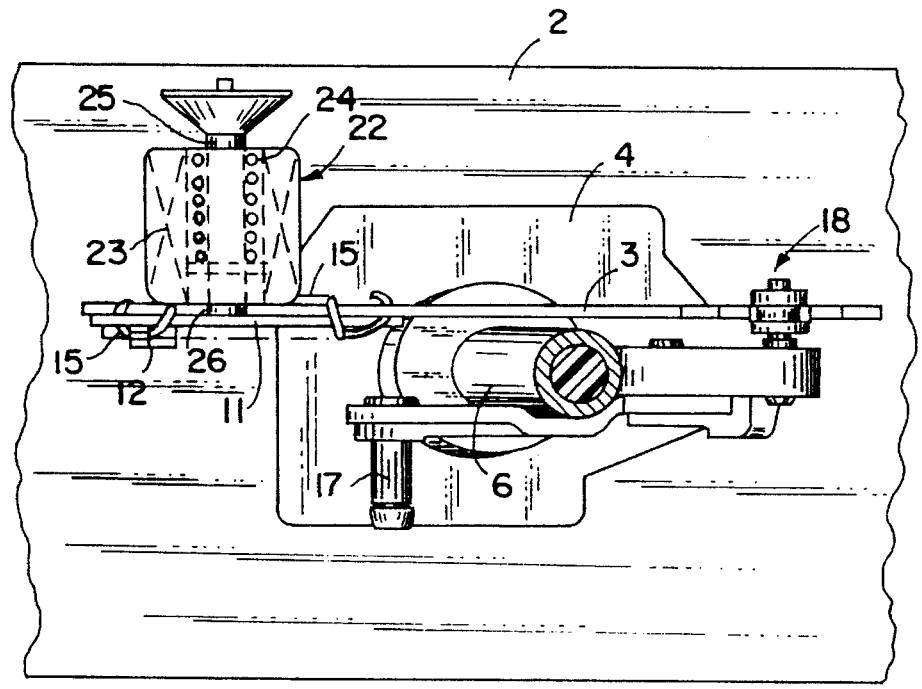
FIG. 2 is a partial top plan view of the shifter of FIG. 1.
Figure 3:
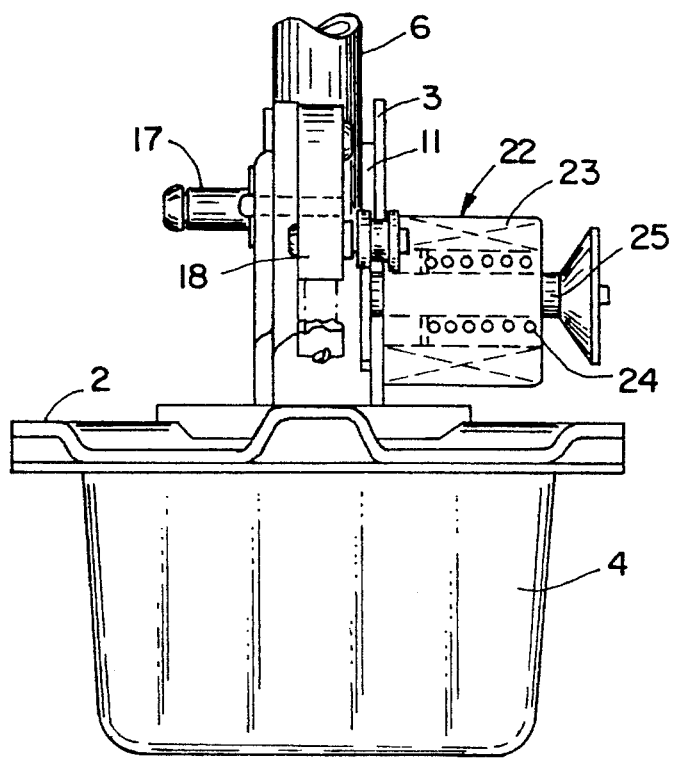
FIG. 3 is an end view of the shifter of FIG. 1.

A shifter feel mechanism 18 is also provided. It includes a roller 19 biased by the spring 20 against the rooster comb section 21 of the detent plate 3. No further explanation of the shifter feel assembly will be made since it does not form an essential part of this invention. As disclosed in FIGS. 2 and 3, a brake control module 22 is provided on the side of the detent plate opposite the lockout arm 11. Control module 22 includes the coil 23 and spring 24, both of which actuate the pin 25, which extends through an opening 26 in the detent plate 3. The pin is biased by spring 24 to an extended position toward the lockout arm 11 and when coils 23 are energized, pin 25 is actuated to a distended position in a direction away from the lockout arm 11. Within the spirit of this invention, the arrangement could be reversed, that is, the spring 24 could be biasing pin 25 to a distended position and the coil 23 could be actuating pin 25 toward an extended position.

The position of the opening 26 and the pin 25 is as disclosed in FIGS. 1 and 4–8. When lockout arm 11 is in the lock position, as disclosed in FIG. 4, with the pin 25 extended, the pin 25 is in a position to engage the edge 27 of lockout arm 11. Thus, when an attempt is made to pivot lockout arm 11 downwardly by actuating pawl 8 by depressing button 10 (FIG. 1), the edge 27 engages pin 25 and lockout arm 11 is prevented from pivoting. Thus, the combination of the locking pin 25 and lockout arm 11 locks pawl 8 in the park "P" notch.

The lockout arm 11 also includes a flange 29 which extends through the opening 30 in the detent plate 3. Flange 29 determines the lowermost position of the lockout arm in the unlocked position as disclosed in FIG. 6. In other words, the L-shaped flange 29 engages the edge 31 when the notch 28 is in the proper position for receiving the pawl 8.

OPERATION

Figure 5:
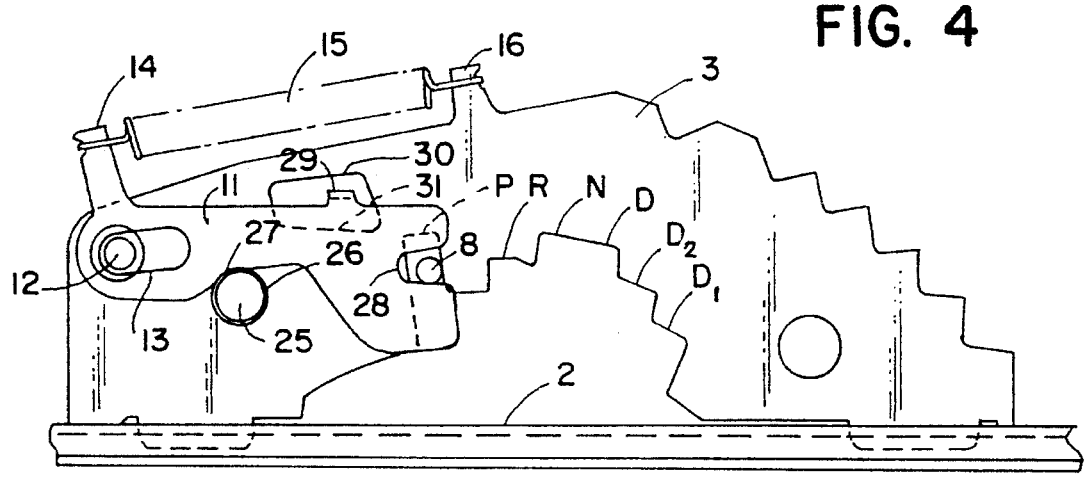
FIG. 5 is a side-elevational view like that of FIG. 4 disclosing the pawl at the start of forcing the lockout arm downwardly.

Having described the details of the various parts of the mechanism of this invention, the operation will now be described. Referring to FIG. 4, it illustrates the position of the pawl 8, lockout arm 11, and pin 25 when the shift lever 5 is in park lock position. In this position, the spring 9 (FIG. 1) in opposition to the biasing force of spring 15 has forced the pawl 8 upwardly into the uppermost position in the park "P" notch. It will be noted that in this position, the edge 27 of the lockout arm 11 is spaced slightly above the pin 25. FIG. 5 illustrates an exertion of force on the pin 8 by depression of the button 10 (FIG. 1) in which event when the brake is not applied, the edge 27 engages pin 25 preventing lockout arm 11 from pivoting and thus locking pawl 8 within the park "P" notch. Accordingly, shift lever 5 (FIG. 1) is locked in "Park."

When the brake of the vehicle is applied, coil 23 is energized causing pin 25 to be withdrawn to the distended position out of engagement with the edge 27 of the lockout arm permitting the pawl 8 to pivot the lockout arm 11 to a position as disclosed in FIG. 6. The spring 15 holds lockout arm 11 in the unlocked position of FIG. 6. When the brake is no longer applied, spring 24 of module 22 forces pin 25 against the back face of lockout arm 11 so that a constant force is being exerted by the spring 24 toward an extended position. However, the lockout arm 11 in the position of FIG. 6 prevents pin 25 from moving to the extended position.

In the unlocked position of FIG. 6, the pawl can be moved to any one of the notches "R," "N," "D," "D$_2$," and "D$_1$." When it is desirable to return the shifting lever to the park position, the button 10 (FIG. 1) is depressed causing the pawl to reach the level as disclosed in FIG. 6 and by movement of the handle 6 to the park position, the pawl will enter the notch 28 of lockout arm 11 after which the release of the button 10, spring 9 will force the pawl upwardly into the position as disclosed in FIG. 4.

Figure 7:
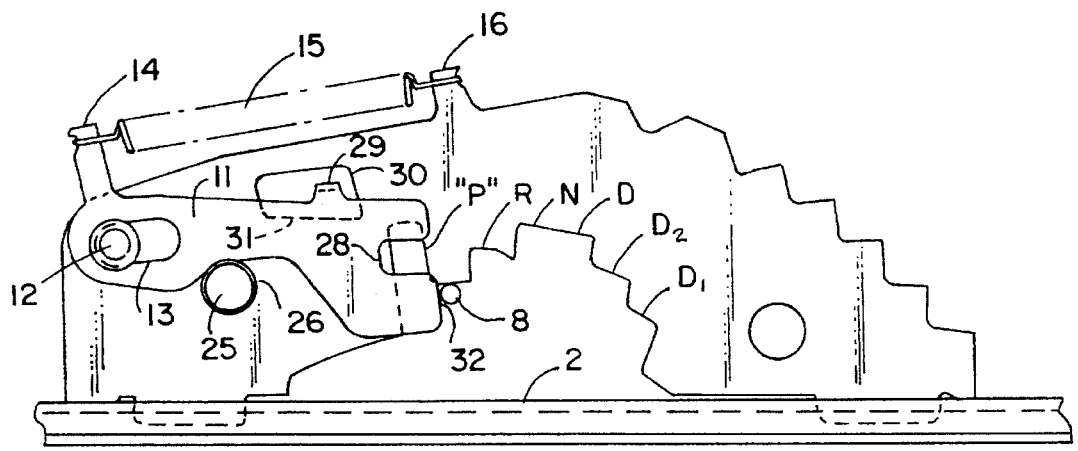
FIG. 7 is a side-elevational view like those of FIGS. 4, 5, and 6 wherein the vehicle has encountered a disturbance such as a severe hole in the road which caused the locking member to accidentally jump upwardly to the locking position.
Figure 8:
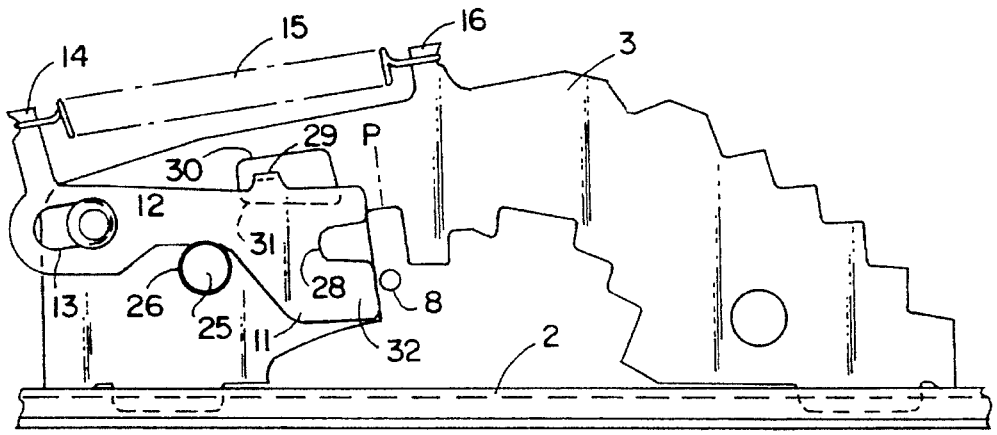
FIG. 8 is a side-elevational view like those of FIGS. 4, 5, 6, and 7 wherein the pawl has shifted the locking arm so as to permit an entry into the park notch of the detent plate.
Figure 9:
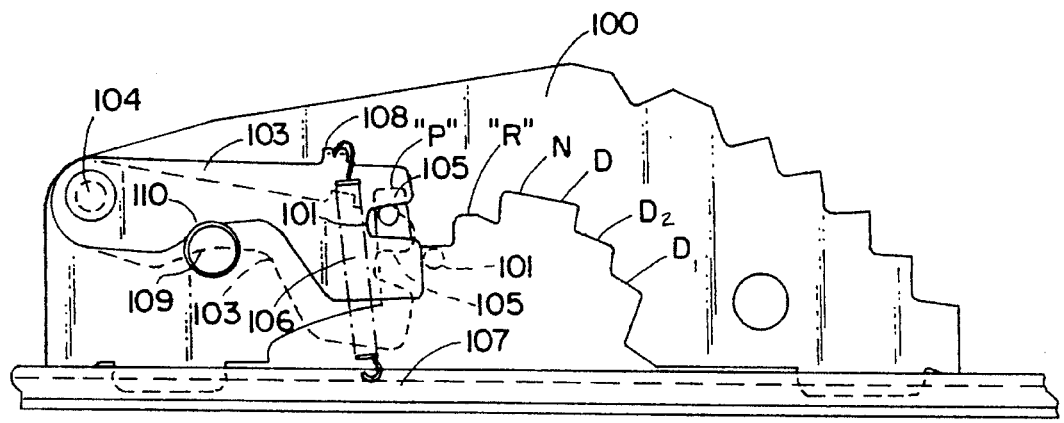
FIG. 9 is a side-elevational view of a prior art device of which the present invention is an improvement by virtue of eliminating accidental locking of the lockout arm which prohibits the entry of the shifter pawl into the park position.

Assuming that pawl 8 is in one of the notches other than the park "P" notch, in which event the lockout arm 11 would normally be in the position as disclosed in FIG. 6, and the vehicle encountered a big bump or other disturbance which would cause lockout arm 11 to jump upwardly into the position of FIG. 7, pin 25 would immediately be forced by spring 24 to the extended position and thus the lockout arm 11 would be locked into position by pin 25 with the pawl 8 unable to return to the park position. Specifically, the lower part 32 beneath the notch 28 would block the path of pawl 8 from returning to the park "P" notch in the prior art structure of FIG. 9 as previously disclosed. In accordance with this invention, the pawl 8 can be returned to the park "P" notch by depressing button 10 and pivoting the shift lever 5 in a clockwise direction as viewed in FIG. 1. Such pivoting of shift lever 5 forces pawl 8 against lockout arm 11 forcing it toward the left. This is permitted by reason of slot 13 riding over the pivot pin 12 causing the entire lockout arm to move linearly to the left as viewed in FIG. 8. In this position, the pawl 8 is free to enter into the park "P" notch. Releasing button 10 causes spring 9 to overcome the bias of spring 15 and move pawl 8 upwardly into park "P" notch in the park lock position of FIG. 4.

Having described our invention, it should become clear that it has solved the problem of the prior art structure discussed above. Those skilled in the art will, of course, appreciate the advantage of the present invention and may also recognize that many modifications can be made without departing from the concept and spirit of the invention. It is therefore intended that modifications thereof are to be included as part of this invention except as expressly excluded by the wording of the following claims.

The embodiments of the invention in which an exclusive property or privilege is claimed are defined as follows:

1. A vehicle transmission shifter for a vehicle having a brake, said vehicle transmission shifter having a brake/park lock mechanism for preventing the shifting of said transmission shifter from park position to another gear position unless the brakes of the vehicle are applied, comprising:

a shifting lever movable from a park position to at least one other gear position;

a detent plate and detent pawl associated with said shifting lever for releasably holding said lever in said park position;

actuator means for actuating said pawl to release said shifting lever for movement to said other gear position;

a lockout arm movable in opposite first and second directions along a given path by said pawl when said pawl is actuated by said actuator means;

said actuator means provided to actuate said pawl to move said lockout arm in said first direction to an unlocked position permitting said shifter to be moved from said park position to said other gear position;

said actuator means also being adapted to actuate said pawl to move said lockout arm in said second direction to a lock position wherein said lockout arm locks said pawl in park position;

an electrically operated control module including a locking member movable between an extended position wherein it locks said lockout arm in said lock position and a retracted position wherein it permits said lockout arm to move to said unlocked position permitting said pawl to escape from park position;

said locking member of said control module being biased to one of said extended position or retracted position and moved by said electrically operated control module to the other of said extended position or retracted position in response to a driver applying the brakes of said vehicle;

said locking member and lockout arm being positioned relative to each other whereby when said lockout arm is in said unlocked position and a driver is not applying the brakes, said locking member is forced against said lockout arm but retained in distended position, the improvement comprising:

means for permitting said pawl when in said other gear position to move said lockout arm when in said locked position from said lock position to a third position permitting movement of said pawl into said park position when said lockout arm has accidentally moved from unlocked position to lock positions wherein said locking member is in an extended position prohibiting pivoting of said lockout arm to said second release position.

2. The shifter of claim 1 in which the park position of the pawl is established by a park notch in the detent plate and said lockout arm in lock position extends over the entrance and exit of said park notch; said lockout arm being movable by said pawl when moved from said other gear position to permit entry of said pawl into said park notch.

3. The shifter of claim 2 in which the movement of said lockout arm to permit entry of said pawl into said park notch by said pawl is linear as said pawl is moved from said gear position to said park position.

4. The shifter of claim 1 in which the lockout arm is pivoted at one end and has a notch at the other end for receiving said pawl and said locking member engages a side edge of said lockout arm when in said extended lock position to prevent pivoting of said lockout arm.

5. The shifter of claim 3 in which the lockout arm is pivoted at one end and has a notch at the other end for receiving said pawl and said locking member and engages a side edge of said lockout arm when in said extended lock position to prevent pivoting of said lockout arm.

6. The shifter of claim 5 in which the lockout arm is pivoted by a pivot member about which said lockout arm is pivoted, said pivot member being located in a slot in said one end of said lockout arm, said slot permitting the linear and pivoted movement of said lockout arm.

7. The shifter of claim 6 in which a biasing means is provided to rotatably bias said lockout arm toward said unlocked position and linearly bias said lockout arm toward lock position.

8. The shifter of claim 7 in which said biasing means includes a lever arm extending from said one end of said lockout arm and a spring is attached to said lever arm and to said detent plate for rotatably and linearly biasing said lockout arm.

9. The shifter of claim 1 in which the lockout arm is a plate parallel to and mounted for pivotal movement on said detent plate, said detent plate having an opening and said lockout arm having a flange extending into said opening providing a stop to establish the degree of said pivotal movement of said lockout arm to said unlocked position over said distended locking member when said locking member is retained in unlocked position by said lockout arm.

10. The shifter of claim 1 in which said lockout arm is mounted for pivotal movement such that in the event said shifter is subjected to a sudden jolt or bump experienced by the vehicle on which it is mounted, said lockout arm may inadvertently pivot and cause said locking member to be forced to said extended lock position.

11. A vehicle transmission shifter for a vehicle having a brake, said vehicle transmission shifter having a brake/park lock mechanism for preventing the shifting of said transmission shifter from park position to another gear position unless the brakes of the vehicle are applied, comprising:

a shifting lever movable from a park position to at least one other gear position;

a detent plate and detent pawl associated with said shifting lever, said detent plate having a park notch for releasably holding said lever in said park position;

actuator means for actuating said pawl to release said shifting lever for movement to said other gear position;

a pivotal lockout arm for preventing in a lock position the pawl from being moved from a park position to said other gear position;

an electrically operated module having a coil, a spring, and a pin forced to an extended position by one of said spring or energization of said coil in a direction orthogonal toward said lockout arm and when in said extended position engages an edge of said lockout arm to prevent it from pivoting out of a lock position so as to hold the lockout arm in a lock position;

said pin being forced to a distended position by one of said spring and energization of said coil upon the brakes of the vehicle being applied permitting the lockout arm to move to a release position;

said pin being forced against the side of said lockout arm upon release of the brakes thereby permitting subsequent return of said pawl to the park position;

said lockout arm being subject to accidental rotation upon the vehicle experiencing a severe jolt or bump; the improvement comprising:

means for permitting said pawl to move said lockout arm from said lock position to a position permitting said pawl to move into said park position.

12. The shifter of claim 11 in which said lockout arm in lock position extends over the entrance and exit of said park notch and is held therein by said pin in said extended position; said lockout arm being movable by said pawl when moved from said other gear position to permit entry of said pawl into said park notch.

13. The shifter of claim 12 in which the movement of said lockout arm to permit entry of said pawl into said park notch by said pawl is linear.

14. The shifter of claim 11 in which the lockout arm is pivoted at one end and has a notch at the other end for receiving said pawl and said pin engages a side edge of said lockout arm when in said extended position to prevent pivoting of said lockout arm as said pawl is moved from said gear position to said park position.

15. The shifter of claim 13 in which the lockout arm is pivoted at one end and a notch at the other end for receiving said pawl and said pin engages a side edge of said lockout arm when in said extended lock position to prevent pivoting of said lockout arm.

16. The shifter of claim 15 in which the lockout arm includes a slot at said one end and is pivoted on a pivot member extending into said slot which permits the linear movement of said lockout arm.

17. The shifter of claim 16 in which a biasing means is provided to rotatably bias said lockout arm toward unlocked position and linearly bias said lockout arm toward lock position.

18. The shifter of claim 17 in which said biasing means includes a lever arm extending from said one end of said lockout arm and a spring is attached thereto and to said detent plate for rotatably and linearly biasing said lockout arm.

19. The shifter of claim 11 in which the lockout arm is a plate parallel to and mounted for pivotal movement on said detent plate, said detent plate having an opening and said lockout arm having a flange extending into said opening providing a stop to establish the degree of said pivotal movement of said lockout arm to unlocked position over said distended pin when said pin is retained in said unlocked position by said lockout arm.

* * * * *

UNITED STATES PATENT AND TRADEMARK OFFICE
CERTIFICATE OF CORRECTION

PATENT NO. : 5,465,818
DATED : November 14, 1995
INVENTOR(S) : Charles Osborn, et. al.

It is certified that error appears in the above-indentified patent and that said Letters Patent is hereby corrected as shown below:

Column 2, line 3;

"ann" should be --arm--.

Column 2, line 9;

"ann" should be --arm--.

Column 2, line 42;

"ann" should be --arm--.

Column 3, line 1;

"ann" should be --arm--.

Column 4, line 18;

"ann" should be --arm--.

Attest:

Signed and Sealed this

Fourth Day of June, 1996

BRUCE LEHMAN

Attesting Officer

Commissioner of Patents and Trademarks